United States Patent [19]

Meyer et al.

[11] 3,958,597

[45] May 25, 1976

[54] THROTTLE CONTROL FOR REMOTE AIR DRIVEN DEVICES

[75] Inventors: Robert W. Meyer, Belfair; Richard I. Schrick, Bremerton, both of Wash.

[73] Assignee: The United States of America as represented by the Secretary of the Navy, Washington, D.C.

[22] Filed: Oct. 21, 1974

[21] Appl. No.: 516,320

[52] U.S. Cl. .................................. 137/546; 92/78; 137/627.5; 137/630.19; 137/637
[51] Int. Cl.² ........................................ F16K 11/14
[58] Field of Search............ 137/546, 627.5, 630.19, 137/637; 92/78, 79, 154; 173/168, 169, DIG. 3

[56] References Cited
UNITED STATES PATENTS

| | | | |
|---|---|---|---|
| 1,084,769 | 1/1914 | Volker | 92/79 X |
| 1,144,758 | 6/1915 | Desmond | 137/627.5 |
| 2,966,138 | 12/1960 | Quackenbush | 173/169 X |
| 3,071,114 | 1/1963 | Hardy | 173/169 X |
| 3,107,695 | 10/1963 | Broadwell | 137/627.5 UX |
| 3,323,602 | 6/1967 | Lysell | 173/169 |

*Primary Examiner*—Robert G. Nilson
*Attorney, Agent, or Firm*—R. S. Sciascia; Charles D. B. Curry

[57] ABSTRACT

A throttle control that provides accurate and reliable control for a plurality of remote air driven devices. The throttle control employs a plurality of primary valves that are built into a common body with a handle and a plurality of operating levers. The body has a single air supply port which directs air through a common chamber to all of the primary valves. In the body are formed a plurality of separate chambers that communicate the outlet air from the plurality of respective primary valves to the plurality of air conduits to supply air to the respective air driven devices. The handle has a chamber through which exhaust air has a tortious flow path to atmosphere. Each primary valve employs an air control valve and an air vent valve that are sequentially actuated by the associated operating lever. When the lever is not depressed, the control valve is closed and the vent valve is open and vents the air in the supply conduit through the handle chamber to atmosphere. Oil or other droplets are separated from the vented air by the tortious flow and are collected in the handle chamber. As the lever is depressed, first the air vent valve is closed and then the air control valve is gradually opened to supply air to the air driven device. The reverse takes place as the lever is released.

6 Claims, 15 Drawing Figures

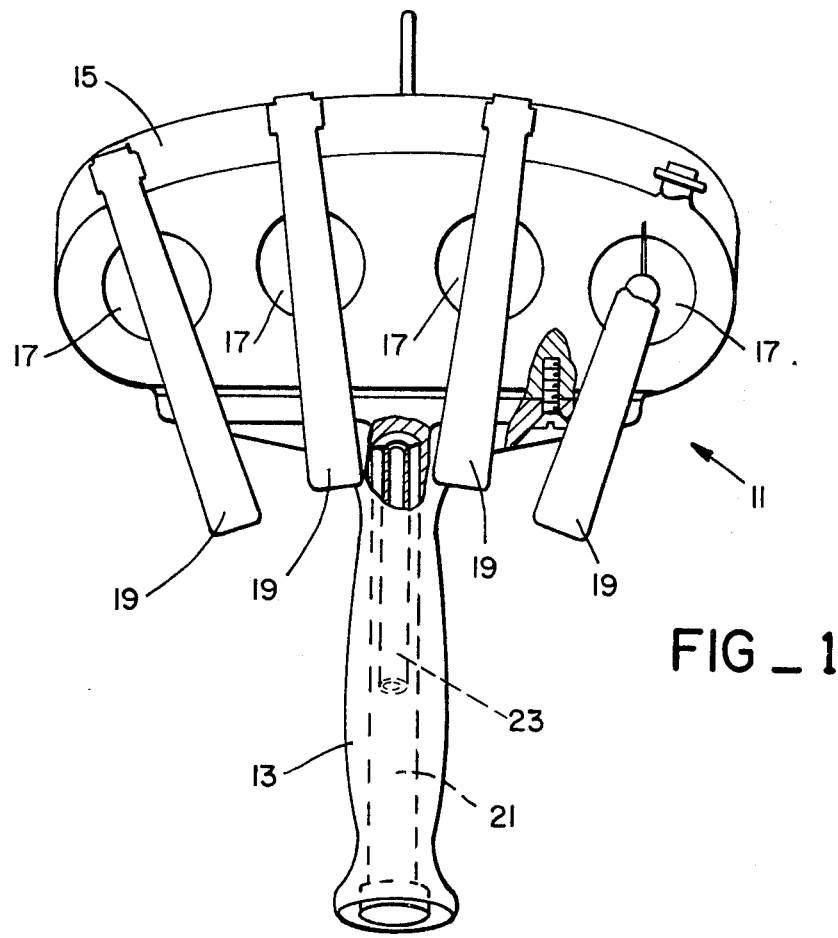
FIG_1
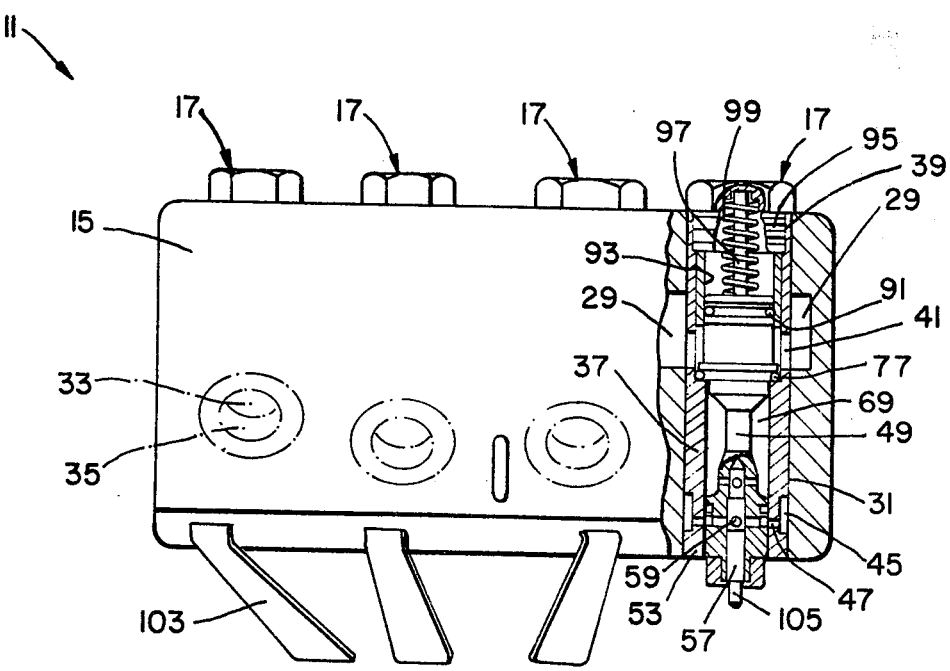
FIG_2

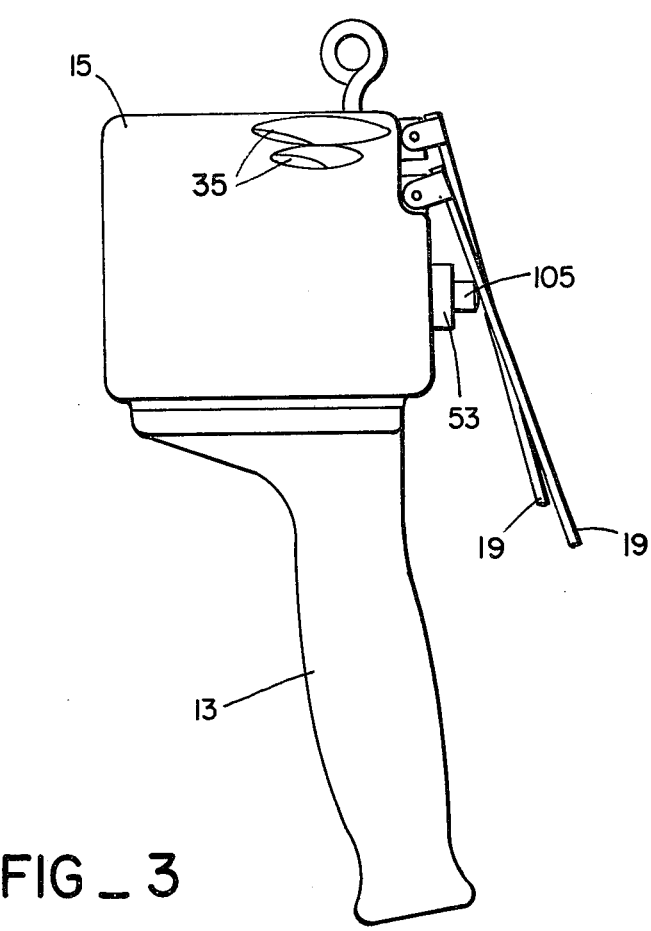
FIG_3
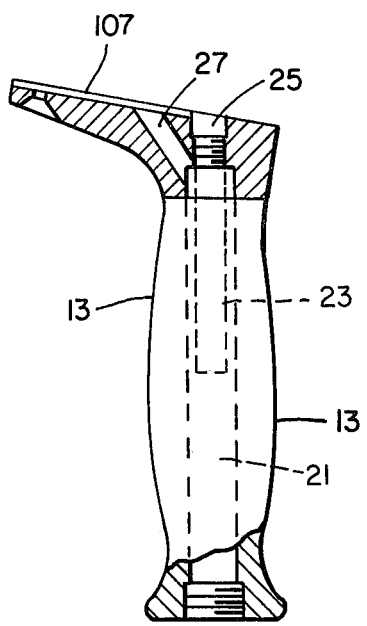
FIG_4
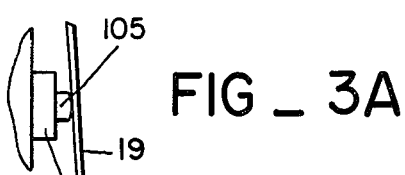
FIG_3A
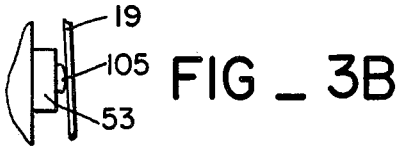
FIG_3B
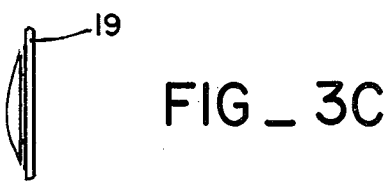
FIG_3C
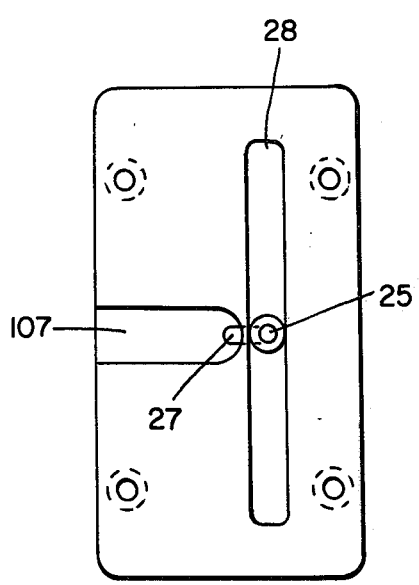
FIG_4A

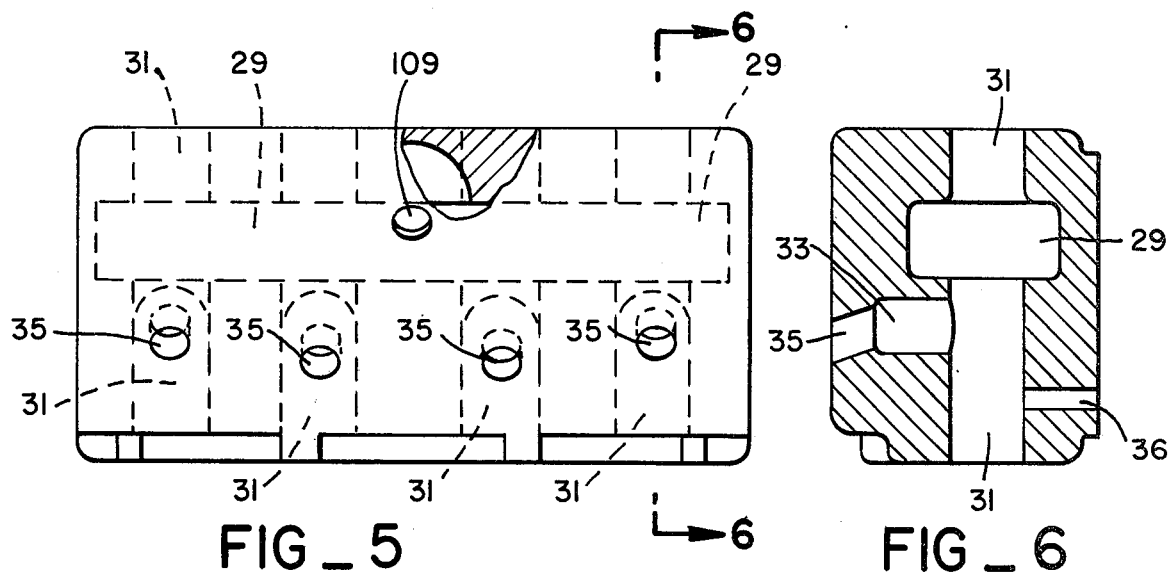
FIG_5  FIG_6
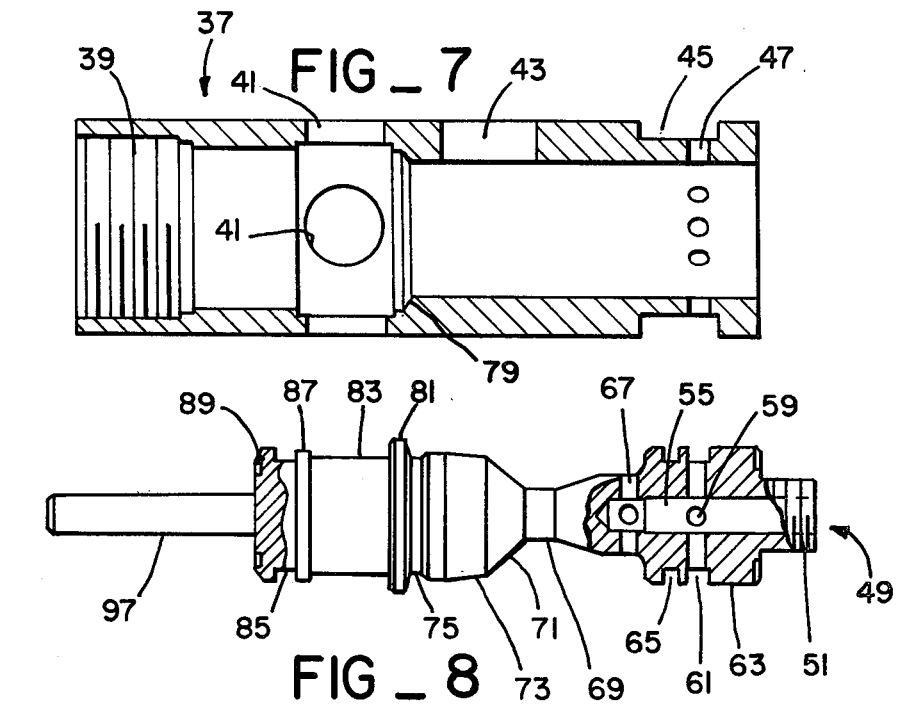
FIG_7
FIG_8
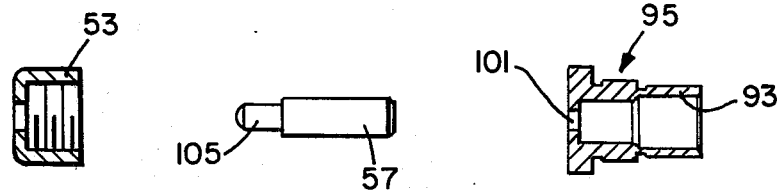
FIG_9  FIG_10  FIG_11

THROTTLE CONTROL FOR REMOTE AIR DRIVEN DEVICES

BACKGROUND OF THE INVENTION

1. Field of the Invention

The present invention relates to an air control device and more particularly to a throttle control for remote air driven devices.

2. Description of the Prior Art

Presently available remote throttle controls by-pass supply air to the atmosphere while supplying air to air driven devices at low rates and while stopped. The venting of supply air while operating at slow rates adversely affects precise speed control and the noise of the escaping air is distracting and undesirable. Also, after periods of idleness, condensed oil, such as lubricating oil, in the supply conduits drain down and drip out of the exhaust outlets.

The present invention overcomes these difficulties by employing a unique throttle control that includes sequentially closing the vent and throttle valves and collecting condensed oil in the handle of the control unit.

SUMMARY OF THE INVENTION

Briefly, the present invention relates to a throttle control that provides accurate and reliable control for a plurality of remote air driven devices. The throttle control employs a plurality of primary valves that are built into a common body with a handle and a plurality of operating levers. The body has a single air supply port which directs air through a common chamber to all of the primary valves. In the body are formed a plurality of separate chambers that communicate the outlet air from the plurality of respective primary valves to the plurality of air conduits to supply air to the respective air driven devices. The handle has a chamber through which exhaust air has a tortious flow path to atmosphere. Each primary valve employs an air control valve and an air vent valve that are sequentially actuated by the associated operating lever. When the lever is not depressed, the control valve is closed and the vent valve is open and vents the air in the supply conduit through the handle chamber to atmosphere. Oil or other droplets are separated from the vented air by the tortious flow and are collected in the handle chamber. As the lever is depressed, first the air vent valve is closed and then the air control valve is gradually opened to supply air to the air driven device. The reverse takes place as the lever is released.

Statement of the Objects of the Invention

An object of the present invention is to provide an effective air throttle control for remote air driven devices;

Another object of the present invention is to provide a throttle control for air driven devices that muffles sound;

Still another object of the present invention is to provide a throttle control for air driven devices to provide precise throttle control for slow and fast air flow rates;

A still further object of the present invention is to prevent the spillage of oil contained in air vented from air supply conduits;

Other objects, advantages and novel features of the present invention will become apparent from the following detail description of the invention when considered in conjunction with the accompanying drawings wherein:

BRIEF DESCRIPTION OF THE DRAWINGS

FIG. 1 is a rear view of the throttle control of the present invention;

FIG. 2 is a top view, partly in section, of the throttle control of the present invention;

FIG. 3 is a side view of the throttle control of the present invention;

FIGS. 3A, 3B and 3C are views illustrating the sequential operation of the throttle control valve of the present invention;

FIG. 4 is a side view of the handle of the throttle control of the present invention;

FIG. 4A is a top view of the handle of FIG. 4;

FIG. 5 is a top view of the body showing the air chambers of the control valve of the present invention;

FIG. 6 is a sectional view of the body taken at section 5—5 of FIG. 5;

FIG. 7 is a sectional view of one of the control valve sleeves used in the throttle control of the present invention;

FIG. 8 is a top view, partly in section, of the control spool used in the throttle control of the present invention;

FIG. 9 is a sectional view of the vent spool retainer used in the throttle control of the present invention;

FIG. 10 is a top view of the vent spool of the throttle control of the present invention; and FIG. 11 is a sectional view of the end cap of the throttle control of the present invention.

DESCRIPTION OF THE PREFERRED EMBODIMENT

In FIGS. 1 through 6 is illustrated the remote throttle control 11 of the present invention. Throttle control 11 includes a handle 13, a body 15, a plurality of individual control valves 17 and control levers 19.

Referring to FIGS. 1 and 4, the handle 13 has a collection chamber 21 that functions to collect oil, for example, and muffle the vented air. The vented air passes through tube 23 shown in dotted lines in FIG. 1, which has one end threaded into opening 25 of FIG. 4 and the other end terminating about half way into collection chamber 21. A drain plug, not shown, is threaded into the bottom end of collection chamber 21. Vented air, which frequently includes entrapped oil droplets, passes downward through tube 23 and discharges into chamber 21 and then passes upward between the tube and chamber wall and out through air vent opening 27. By using this tortious air path the oil droplets are separated from the air and collect at the bottom of chamber 21 in handle 13 and the vented air is then discharged, free of oil, through opening 27 which is in a direction away from the operator. The venting air is muffled in handle 13 to minimize the undesirable noise of escaping air.

Referring to FIGS. 2, 5 and 6 body 15 of throttle control 11 is preferably casted to form air inlet manifold 29, a plurality of sleeve openings 31, a plurality of air outlet cavities 33 and a plurality of threaded air outlet openings 35 that communicate with their respective cavities 33. It should be noted that air inlet manifold 29 is common to all of control valves 17 whereas the air outlet cavities 33 and openings 35 are connected to individual control valves 17.

In FIGS. 2 and 7 are illustrated the control valve sleeve 37 used in each of control valves 17. Sleeve 37 includes a rear threaded opening 39, four inlet air openings 41, an air outlet opening 43 (air outlet opening 43 communicates with outlet cavity 33 of FIG. 6), air vent groove 45 and outlet air vent openings 47. Air vent groove 45 vents into air vent opening 36 of FIG. 6. Air vent opening 36 communicates with air vent manifold 28 of FIG. 4A.

In FIGS. 2 and 8 are illustrated the control spool 49 used in each of control valves 19. Control spool 49 includes male threads 51 for vent spool retainer 53 of FIG. 9, and longitudinal opening 55 for vent spool 57 shown in FIG. 10. A plurality of radial air vent openings 59 communicate between longitudinal opening 55 and vent groove 61. Control spool 49 also includes front spool guide 63, O-ring groove 65, and a plurality of air vent inlet openings 67 that communicate with air outlet opening 43 of FIG. 7 and outlet cavity 33 of FIG. 6. Control spool 49 also includes a reduced section 69 which is the outlet part of the control spool and communicates with air outlet opening 43 of FIG. 7 and outlet cavity 33 of FIG. 6. Reduced section 69 includes large angle conical section 71 and small angle conical section 73. The small angle conical section is the principle control or air throttle section of the control valve as hereinafter explained. Control spool 49 also includes O-ring groove 75. It should be noted that the O-ring 77 of FIG. 2 is positioned in O-ring groove 75 of FIG. 8 such that it abuts shoulder 79 of FIG. 7 to provide a seal when the spool 49 of FIG. 8 is positioned in sleeve 37 of FIG. 7 to its extreme closed position. In this position the O-ring is clamped between shoulder 79 of FIG. 7 and shoulder 81 of the spool of FIG. 8. Reduced section 83 receives the inlet air from inlet air opening 41 of the sleeve of FIG. 7. Spool 49 includes another O-ring groove 85 formed between shoulders 87 and 89. The O-ring 91 of FIG. 2 slides along the interior cylindrical surface 93 of end cap 95 of FIG. 11 to provide a proper seal. Spool 49 is maintained in the closed position by the differential force created by the relationship $(\pi/4) d_{81}^2 - (\pi/4) d_{83}^2 - [(\pi/4) d_{87}^2 - (\pi/4) d_{83}^2]$ where $d_{81}$ is the outside diameter of shoulder 81;

$d_{83}$ is the outside diameter of reduced section 83; and $d_{87}$ is the outside diameter of shoulder 87.

Extending from the rear of spool 49 is cylindrical shaft 97. Shaft 97 functions as a guide for the rear of the control spool, a spring retainer for return of the control spool to its closed position by spring 99 of FIG. 2, and to provide a manual means for forceably returning the control spool to the closed position in the event the spring 99 does not perform this function. When assembled shaft 97 passes through opening 101 of FIG. 11.

In operation when one of levers 19 of FIGS. 1, 2 and 3 is depressed, the initial action is to depress the end 105 of vent spool 57 of FIGS. 2, 3, 3A, 3B and 10. This condition is best shown in FIGS. 2 and 3B. When this occurs vent spool 57 moves inward and seals openings 59 of the control spool of FIGS. 2 and 8. When end 105 is fully out as shown in FIGS. 2, 3 and 3A air is vented from the exterior hose, not shown, that is connected between the driven air equipment and air outlet opening 35 as best shown in FIGS. 5 and 6. Therefore, the air from this hose is vented through air outlet opening 35 of FIGS. 5 and 6, outlet cavity 33 of FIGS. 5 and 6, air outlet opening 43 of FIG. 7, air vent inlet opening 67 of FIG. 8, air vent opening 55 of FIG. 8, radial air vent openings 59 of FIG. 8 vent groove 61 of FIG. 8, air vent opening 36 of FIG. 6, air vent manifold 28 of FIG. 4A, through air vent tube opening 25 of FIGS. 4 and 4A, tube 23 of FIG. 1, into collection chamber 21 of FIG. 1 and back upward through the handle between tube 23 and chamber 21 and out through air vent opening 27 of FIG. 4 to air vent cavity 107 to atmosphere.

When lever 103 is fully depressed, as shown in FIG. 3C, then control spool 49 moves inward to unseat O-ring 77 which exposes reduced section 69 to the air inlet opening 41. Supply air passes through opening 109 of FIG. 5, through air inlet manifold 29, through inlet air opening 41 of FIG. 7, through reduced section 69 of FIGS. 2 and 8, through air outlet opening 43 of FIG. 7, through outlet cavity 33 of FIG. 6, through air outlet opening 35 through a conduit, not shown, to the air equipment.

When the air driven equipment is to be shut off then handle lever 103 is released which seats 0-ring 77 and then vents the air in the conduit to atmosphere as previously explained.

What is claimed is:

1. A throttle control comprising:
  a. a body;
  b. at least one valve;
  c. said at least one valve including a control valve and a vent valve;
  d. means for sequentially opening said vent valve and then said control valve;
  e. said body includes a handle;
  f. said handle includes a chamber;
  g. said vent valve having an outlet that is operably connected to said chamber and said chamber being operably connected to atmosphere;
  h. a tube having one end connected to said outlet of said vent valve and the other end extending into said chamber in said handle;
  i. an atmospheric outlet opening in said chamber positioned adjacent said one end of said tube; and
  j. whereby liquid droplets contained in a gas discharged in said chamber will be separated from said gas and collected in said chamber.

2. The throttle control of claim 1 wherein:
  a. said control valve comprises a sleeve and a control spool slidably positioned within said sleeve.

3. The throttle control of claim 2 wherein:
  a. said vent valve comprises a control spool slidably positioned in one end of said control valve.

4. The throttle control of claim 3 including:
  a. a lever;
  b. said lever being operably connected to one end of said valve;
  c. one end of said control spool extending from said body a first predetermined distance;
  d. one end of said vent spool extending from said body a second predetermined distance whereby said second predetermined distance is greater than said first predetermined distance; and
  e. whereby actuation of said lever first depresses said vent spool and then depresses said vent spool and said control spool.

5. The throttle control of claim 1 wherein:
  a. said at least one valve comprises a plurality of valves;
  b. said body includes an inlet chamber that is operably connected to the inlets of each of said plurality of valves; and c. said body includes a plurality of outlet chambers respectively operably connected to the outlets of said plurality of valves.

6. A throttle control comprising:
a. a body;
b. at least one valve;
c. said at least one valve including a control valve and a vent valve;
d. means for sequentially opening said vent valve and then said control valve;
e. said control valve comprises a sleeve and a control spool slidably positioned within said sleeve;
f. said vent valve comprises a control spool slidably positioned in one end of said control valve;
g. a lever;
h. said lever being operably connected to one end of said valve;
i. one end of said control spool extending from said body a first predetermined distance;
j. one end of said vent spool extending from said body a second predetermined distance whereby said second predetermined distance is greater than said first predetermined distance; and
k. whereby actuation of said lever first depresses said vent spool and then depresses said vent spool and said control spool.

* * * * *